United States Patent
Miwa et al.

(10) Patent No.: US 6,878,113 B2
(45) Date of Patent: Apr. 12, 2005

(54) ULTRASONIC DIAGNOSTIC APPARATUS AND METHOD FOR PROCESSING ULTRASONIC SIGNAL

(75) Inventors: Yuichi Miwa, Tokyo (JP); Shin-ichiro Umemura, Hachioji (JP); Ryuichi Shinomura, Higashimatsuyama (JP); Hirotaka Baba, Kashiwa (JP); Naoto Fujita, Nagareyama (JP)

(73) Assignee: Hitachi Medical Corporation, Tokyo (JP)

( * ) Notice: Subject to any disclaimer, the term of this patent is extended or adjusted under 35 U.S.C. 154(b) by 110 days.

(21) Appl. No.: 10/297,251

(22) PCT Filed: Jul. 2, 2001

(86) PCT No.: PCT/JP01/05715
§ 371 (c)(1),
(2), (4) Date: Dec. 4, 2002

(87) PCT Pub. No.: WO02/17791
PCT Pub. Date: Mar. 7, 2002

(65) Prior Publication Data
US 2003/0149361 A1 Aug. 7, 2003

(30) Foreign Application Priority Data
Aug. 30, 2000 (JP) .................................. 2000-265992

(51) Int. Cl.⁷ .................................................. A61B 8/00
(52) U.S. Cl. ..................................................... 600/443
(58) Field of Search ................................ 600/443, 447, 600/454–456, 458; 73/625–626; 367/103–105

(56) References Cited

U.S. PATENT DOCUMENTS

| | | | | |
|---|---|---|---|---|
| 4,140,022 A | * | 2/1979 | Maslak | 73/626 |
| 4,839,652 A | * | 6/1989 | O'Donnell et al. | 341/122 |
| 5,027,821 A | * | 7/1991 | Hirama et al. | 600/447 |
| 5,515,727 A | * | 5/1996 | Miwa et al. | 73/602 |
| 5,787,049 A | * | 7/1998 | Bates | 367/7 |
| 5,831,168 A | * | 11/1998 | Shinomura et al. | 73/602 |
| 6,001,062 A | * | 12/1999 | Masters | 600/443 |
| 6,080,107 A | * | 6/2000 | Poland | 600/458 |
| 6,248,071 B1 | * | 6/2001 | Lin | 600/443 |
| 6,383,140 B1 | * | 5/2002 | Miwa et al. | 600/443 |

FOREIGN PATENT DOCUMENTS

| | | | |
|---|---|---|---|
| EP | 1042985 A1 | * | 10/2000 |
| JP | 52-20857 | * | 2/1977 |
| JP | 11-276477 | * | 10/1999 |

* cited by examiner

Primary Examiner—Francis J. Jaworski
(74) Attorney, Agent, or Firm—Antonelli, Terry, Stout & Kraus, LLP

(57) ABSTRACT

An ultrasonic diagnostic apparatus acquires images different in a frequency. The invention is composed of a transducer including plural elements for sending an ultrasonic wave and receiving the reflected ultrasonic wave, analog to digital converters that digitize plural received signals, first mixers that respectively multiply a signal from the converter and a first digital reference signal, first filters that respectively extract a signal having a predetermined center frequency from a signal from each first mixer, digital delay units that respectively delay a signal from each first filter, an adder that adds plural signals from the digital delay units, and a second mixer that multiplies a signal from the adder and a second digital reference signal. An envelope detector detects a signal from the second mixer, and a scan converter converts a signal from the detector to a picture signal for display, so the pass band of the filter is not required to be changed.

9 Claims, 8 Drawing Sheets

ULTRASONIC DIAGNOSTIC APPARATUS AND METHOD FOR PROCESSING ULTRASONIC SIGNAL

TECHNICAL FIELD

The present invention relates to an ultrasonic diagnostic apparatus, particularly relates to an ultrasonic diagnostic apparatus for nondestructive inspection that executes processing for converting an ultrasonic signal to a digital signal and an ultrasonic diagnostic apparatus for medicine.

BACKGROUND ART

FIG. 2 shows an example of the configuration of an ultrasonic diagnostic apparatus according to prior art using a digital circuit. An ultrasonic signal s (t) sent from a transducer 1 composed of plural elements and having a mean frequency $\omega_s$ can be approximately expressed by an expression 1. "A(t)" denotes the shape of an envelope of the sent signal, "t" denotes a variable of time and "j" denotes an imaginary unit.

$$s(t) = A(t) \times \{\exp(j\omega_s t) + \exp(-j\omega_s t)\} \qquad \text{Expression 1}$$

The transducer 1 receives an ultrasonic wave reflected on an object of inspection. A signal $f_n$ (t) received by an "n"th element of the transducer 1 is expressed by an expression 2 in case propagation delay time from the sending of an ultrasonic wave to the receiving of it is $\tau_n$. "$\phi_n$" denotes a phase of the received signal $f_n$ (t) and is acquired in an expression 3.

$$\begin{aligned} f_n(t) &= s(t - \tau_n) \\ &= A(t - \tau_n) \times \{\exp[j(\omega_s t - \phi_n)] + \exp[-j(\omega_s t - \phi_n)]\} \end{aligned} \qquad \text{Expression 2}$$

$$\phi_n = \omega_s \tau_n \qquad \text{Expression 3}$$

When the number of elements used for one sending/receiving of an ultrasonic wave is N, N pieces of output signals from the transducer 1 are respectively expressed by the expression 2. The propagation delay time $\tau_n$ is different for every element. In the following description, element n used for a series of one sending/receiving of an ultrasonic wave are called channel n and "N" denotes the number of channels. In FIGS. 1, 2 and 6, a selecting circuit and a driving circuit for N elements used for a series of sending/receiving of an ultrasonic wave are omitted and are not shown.

An analog to digital converter 2 converts the received signal $f_n$ (t) to digital data and the succeeding signal processing is all digital signal processing. The precision of operation is enhanced by digital signal processing, compared with that in analog signal processing. An A/D converter is generally used for the analog to digital conversion part 2.

A mixer 3 multiplies the received signal $f_n$ (t) converted to digital data and a digital reference signal $h_n$ (t) expressed by an expression 4. A product $g_n$ (t) of multiplication is expressed by an expression 5. "$h_n$ (t)" has the same frequency as the center frequency $\omega_s$ of the received signal.

$$h_n(t) = \exp(j\omega_s t) \qquad \text{Expression 4}$$

$$\begin{aligned} g_n(t) &= f_n(t) h_n(t) \\ &= A(t - \tau_n) \times \{\exp[j(2\omega_s t - \phi_n)] + \exp(j\phi_n)\} \end{aligned} \qquad \text{Expression 5}$$

Next, a filter 4 extracts a low-frequency component from the product of multiplication (the expression 5). The product of the multiplication from which the low-frequency component is extracted is expressed by an expression 6. The filter 4 is formed by an accumulator and an element for computing the sum of products for example.

$$g_n(t) = A(t - \tau_n) \times \exp(j\phi_n) \qquad \text{Expression 6}$$

A digital delay unit 5 multiplies a signal acquired by delaying a signal output from the filter 4 and expressed by the expression 6 by $\tau_n$ by $\exp(-j\phi_n)$. A signal $V_n$ (t) output from the digital delay unit 5 is expressed by an expression 7. The output signal $V_n$ (t) is fixed independently of a channel without depending upon n.

$$\begin{aligned} V_n(t) &= g_n(t + \tau_n) \times \exp(-j\phi_n) \\ &= A(t) \end{aligned} \qquad \text{Expression 7}$$

The output signal $V_n$ (t) output from the digital delay unit 5 is added in an adder 6 by the number (N) of all channels of a series of element n (channel n) used for a series of sending/receiving of an ultrasonic wave. A result of addition grows N times of a signal of a single channel, if a phase of each channel is coincident. N signal lines from the transducer 1 to the adder 6 are converted to a signal line in the adder 6.

In the above description, as each processing in the analog to digital converter 2, the mixer 3, the filter 4 and the digital delay unit 5 is executed every channel, parallel N pieces of respective units are required.

In this process, signals received from directions except a desired direction vanish because they have different phases. Signal processing described above is generally called beam forming. Ultrasonic beams can be formed in the desired direction by the beam forming.

For documents related to the beam forming addition, there are Japanese patent No. 1333370 and U.S. Pat. No. 4,140,022 and U.S. Pat. No. 4,983,970.

In an envelope detector 7, the absolute value of "N×A(t)" which is a signal output from the adder 6 is acquired and a scan converter 8 applies signal processing such as the compression of a logarithm and gamma conversion to a signal output from the envelope detector 7. A signal output from the scan converter 8 is displayed on a display 9 as a tomographic image of an object to be inspected. In the expression 7, a complex number is generally acquired and the envelope detector 7 calculates the absolute value of the complex number (the root square sum of the real part and the imaginary part).

In the ultrasonic diagnostic apparatus according to the prior art shown in FIG. 2, the center frequency of the received signal to be imaged is required to be determined beforehand. In the conventional type apparatus shown in FIG. 2, the center frequency of the received signal to be imaged is the same $\omega_s$ as the center frequency of the sent signal and is equal to the frequency of the digital reference signal $h_n$ (t). The ultrasonic diagnostic apparatus according to the prior art shown in FIG. 2 has the problem that the frequency of the digital reference signal $h_n$ (t) is required to be equalized to the center frequency of the received signal to be imaged and the center frequency of the received signal to be imaged is limited to the predetermined one frequency.

The ultrasonic diagnostic apparatus according to the prior art shown in FIG. 2 has the problem that as the filter 4 removes the high-frequency component ($2\omega_s$) which is an unnecessary component from the signal output from the mixer 3, the frequency of the unnecessary high-frequency component also varies in case the center frequency $\omega_s$ of the received signal to be imaged is varied and the pass band of the filter 4 is required to be varied in accordance with the center frequency of the received signal to be imaged.

There is the problem that as the filter 4 is required for every channel, the scale of the apparatus is enlarged when the configuration of the filter 4 is complex and the apparatus becomes high-priced.

DISCLOSURE OF THE INVENTION

The object of the invention is to provide an ultrasonic diagnostic apparatus in which plural images can be formed based upon received signals different in the center frequency without changing the pass band of the filter.

Another object of the invention is to provide an ultrasonic diagnostic apparatus in which signal processing for acquiring plural images based upon received signals different in the center frequency can be simultaneously executed in parallel and the pass band of the filter of each channel is not required to be varied even if the center frequencies of received signals to be imaged are varied.

To achieve the objects, the ultrasonic diagnostic apparatus according to the invention is provided with the following configuration.

In the first configuration of the invention, plural received signals received by a transducer composed of plural elements for sending an ultrasonic wave to an object to be inspected and receiving the ultrasonic wave reflected from the object to be inspected are digitized in an analog to digital converter. A first mixer multiplies a signal output from the analog to digital converter and a first digital reference signal.

The first filter extracts a signal having a predetermined center frequency from the signal output from the first mixer. A digital delay unit delays the signal output from the first filter and an adder adds plural signals output from the digital delay unit.

The second mixer multiplies the signal output from the adder and the second digital reference signal. An envelope detector detects the signal output from the second mixer, a scan converter converts the signal output from the envelope detector to a picture signal and a display displays the signal output from the scan converter.

In the first configuration, the sum of the frequency of the first digital reference signal and the frequency of the second digital reference signal is equalized to the center frequency of the received signal to be imaged.

In the second configuration of the invention, plural signal processing circuits each of which is composed of the second mixer that multiplies the signal output from the adder and the second digital reference signal, the second filter that extracts a signal having a predetermined center frequency from a signal output from the second mixer, an envelope detector that detects the signal output from the second filter and a scan converter that converts the signal output from the envelope detector to a picture signal are connected to an output terminal of the adder in the first configuration of the invention in parallel. A display that displays the signal output from the scan converter may be also provided to each signal processing circuit.

In the second configuration, in each signal processing circuit, the second filter extracts a signal having a predetermined center frequency different for every signal processing circuit from the signal output from the second mixer and the envelope detector detects the signal output from the second filter.

The sum of the frequency of the first digital reference signal and the frequency of the second digital reference signal is equalized to the center frequency of the received signal to be imaged. Signal processing for acquiring images the respective center frequencies of which are different is simultaneously executed in parallel. Images based upon received signals respectively having a different center frequency are displayed on a display of each signal processing circuit or the same single display.

In the third configuration of the invention, first and second signal processing circuits each of which is composed of the second mixer that multiplies a signal output from the adder and the second digital reference signal, the second filter that extracts a signal having a predetermined center frequency from the signal output from the second mixer, an envelope detector that detects the signal output from the second filter and a scan converter that converts the signal output from the envelope detector to a picture signal are connected to the output terminal of the adder in the first configuration of the invention in parallel. A display that displays the signal output from the scan converter may be also provided to the first and second signal processing circuits.

In the third configuration, in the first and second signal processing circuits, the second filter extracts a signal having a predetermined center frequency different between the first and second signal processing circuits from the signal output from the second mixer and the envelope detector detects a signal output from the second filter. Signal processing for acquiring images of the first and second center frequencies is simultaneously executed in parallel.

The frequency of the first digital reference signal is set between the center frequency of the first received signal and the center frequency of the second received signal and desirably, is set to their mean value. An image based upon a received signal having the first center frequency is displayed on a display of the first signal processing circuit and an image based upon a received signal having the second center frequency is displayed on a display of the second signal processing circuit. Or images based upon received signals having the first and second center frequencies are displayed on the same single display.

The digital ultrasonic diagnostic apparatus according to the invention is characterized in that received signals having different center frequencies can be imaged without changing the pass band of the filter.

Also, the digital ultrasonic diagnostic apparatus according to the invention is characterized in that signal processing for acquiring plural images the respective center frequencies of which are different can be simultaneously executed in parallel without changing the configuration including the analog to digital converter 2, the mixer 3, the filter 4 and the digital delay unit 5 respectively required every channel of the ultrasonic diagnostic apparatus according to the prior art shown in FIG. 2 and even if the center frequency of a received signal to be imaged is varied, the pass band of the filter every channel is not required to be varied.

Further, the invention provides an ultrasonic diagnostic apparatus provided with a transducer composed of plural elements, a selecting/driving circuit for sending an ultrasonic wave having a center frequency $\omega_s$ to an object to be inspected and selecting plural (n pieces of) elements (n=1, 2, - - - , N) that receive the ultrasonic wave reflected from the object to be inspected and having the center frequency $\omega_s$, an analog to digital converter provided corresponding to each of the plural (n pieces of) elements (n=1, 2, - - - , N) for digitizing a signal received by the element, a first mixer provided corresponding to the analog to digital converter corresponding to each element for multiplying a signal output from the analog to digital converter and the first digital reference signal having a frequency $\omega_m$ different from the center frequency $\omega_s$, the first filter provided corresponding to the first mixer corresponding to each element for extracting a signal having a frequency ($\omega_m-\omega_s$) from a signal output from the first mixer, a digital delay unit provided corresponding to the first filter corresponding to each element for multiplying a signal output from the first filter and delayed by propagation delay time $\tau_n$ different every element from the sending of the ultrasonic wave to the receiving of it by "exp ($-j\omega_m\tau_n$)", an adder that adds respective signals output from the digital delay units corresponding to the plural (n pieces of) elements (n=1, 2, - - -, N), the second mixer that multiplies a signal output from the adder and a second digital reference signal having a frequency ($\omega_s-\omega_m$), an envelope detector that detects the signal output from the second mixer, a scan converter that converts the signal output from the envelope detector to a picture signal and a display that displays the signal output from the scan converter and characterized in that a received signal having the center frequency $\omega_s$ is imaged and displayed.

Furthermore, the invention provides a method of processing an ultrasonic signal provided with the following processes;

(1) a process for selecting and driving the plural (n pieces of) elements (n=1, 2, - - -, N) of the transducer composed of plural elements for sending an ultrasonic wave having a center frequency $\omega_s$ to an object to be inspected and receiving the ultrasonic wave reflected from the object to be inspected and having the center frequency $\omega_s$;

(2) a process for digitizing the plural received signals received by each element in the analog to digital converters provided corresponding to the plural (n pieces of) elements (n=1, 2, - - -, N);

(3) a process for multiplying a signal output from the analog to digital converter and a first digital reference signal having a frequency $\omega_m$ different from the center frequency $\omega_s$ in the first mixer provided corresponding to the analog to digital converter corresponding to each element;

(4) a process for extracting a signal having a frequency ($\omega_m-\omega_s$) from a signal output from the first mixer in the first filter provided corresponding to the first mixer corresponding to each element;

(5) a process for multiplying a signal output from the first filter and delayed by propagation delay time $\tau_n$ different for every element from the sending of the ultrasonic wave to the receiving of it by "exp($-j\omega_m\tau_n$)" in the digital delay unit provided corresponding to the first filter corresponding to each element;

(6) a process for adding signals output from the digital delay units corresponding to the plural (n pieces of) elements (n=1, 2, - - -, N) in the adder;

(7) a process for multiplying a signal output from the adder and the second digital reference signal having a frequency ($\omega_s-\omega_m$) in the second mixer;

(8) a process for detecting a signal output from the second mixer in the envelope detector;

(9) a process for converting a signal output from the envelope detector to a picture signal in the scan converter; and

(10) a process for displaying a signal output from the scan converter on the display and characterized in that a received signal having the center frequency $\omega_s$ is imaged and displayed.

BEST MODE FOR CARRYING OUT THE INVENTION

Figure 1:
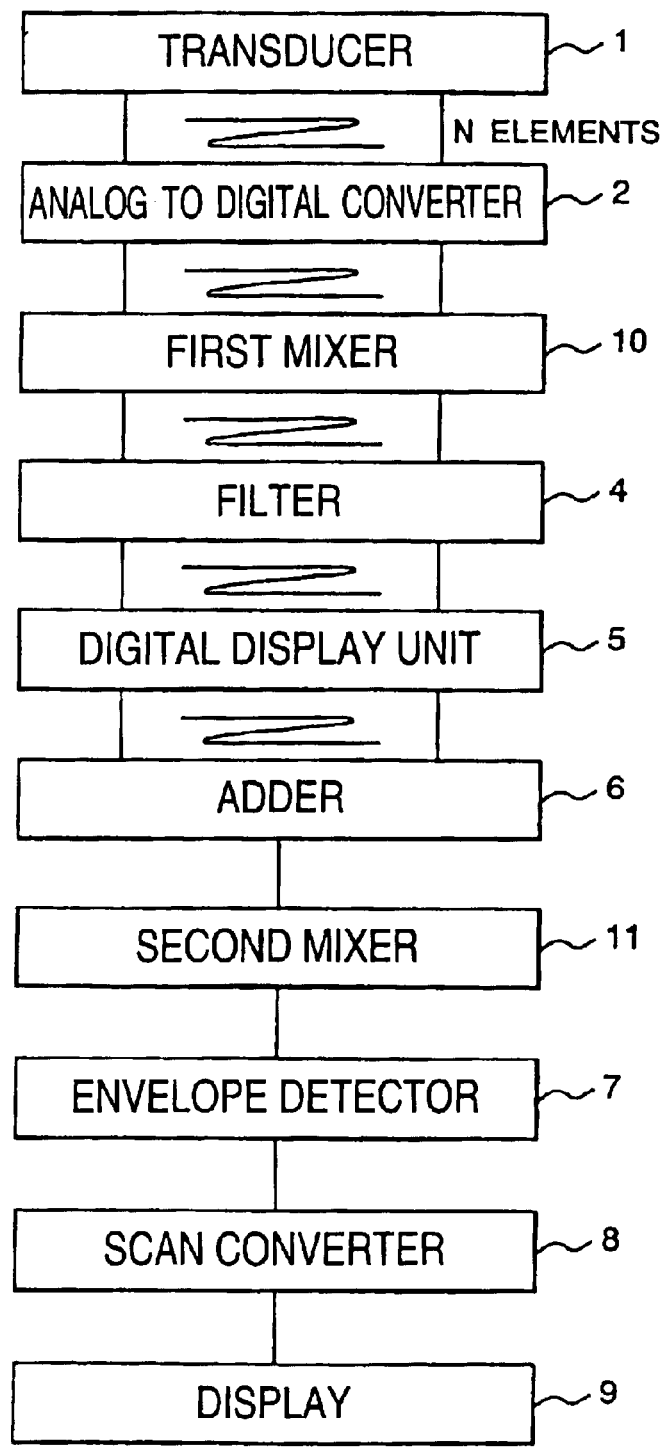
FIG. 1 is a block diagram showing an example of the configuration of an ultrasonic diagnostic apparatus equivalent to the first embodiment of the invention.

Referring to the drawings, embodiments of the invention will be described in detail below. In the following embodiments, an ultrasonic diagnostic apparatus for medicine in which the digital signal processing of an ultrasonic signal is executed is described for example, however, the invention can be similarly applied to an ultrasonic apparatus for nondestructive inspection.

First Embodiment

FIG. 1 shows an example of the configuration of an ultrasonic diagnostic apparatus equivalent to the first embodiment of the invention. As shown in FIG. 1, the configuration except the first mixer 10 and the second mixer 11 is the same as the configuration of the ultrasonic diagnostic apparatus according to the prior art shown in FIG. 2. The signal $f_n$ (t) received by the "n"th element of the transducer 1 due to an ultrasonic signal s (t) sent from the transducer 1 and having a center frequency $\omega_s$ is expressed by an expression 8 when propagation delay time from the sending of an ultrasonic wave to the receiving of it is $\tau_n$ as in the expression 2. "$\phi_n$" denotes a phase of the received signal $f_n$ (t) and is expressed by an expression 9 as in the expression 3.

In case the number of elements used for one sending/receiving of an ultrasonic wave is N, N pieces of output signals output from the transducer 1 are respectively expressed by the expression 8. The propagation delay time $\tau_n$ is different every element.

$$f_n(t) = s(t-\tau_n) \qquad \text{Expression 8}$$
$$= A(t-\tau_n) \times \{\exp[j(\omega_s t - \phi_n)] + \exp[-j(\omega_s t - \phi_n)]\} \quad \text{Expression 9}$$
$$\phi_n = \omega_s \tau_n$$

The received signal $f_n$ (t) is converted to digital data by then analog to digital converter (an A/D converter) 2 and the succeeding signal processing is all digital signal processing using the expression 8 in which a discrete value is acquired.

The first mixer 10 multiplies the received signal $f_n(t)$ converted to digital data and a digital reference signal $h_n(t)$ expressed by an expression 10. A product $g_n(t)$ of multiplication is expressed by an expression 11. In the invention, a frequency of the digital reference signal $h_n(t)$ and center frequencies $\omega_s$ of received signals can be differentiated. In case a frequency of $h_n(t)$ is $\omega_m$, $h_n(t)$ is as follows.

$$h_n(t) = \exp(j\omega_m t) \qquad \text{Expression 10}$$

$$\begin{aligned} g_n(t) &= f_n(t)h_n(t) \qquad \text{Expression 11} \\ &= A(t-\tau_n) \times \{\exp[j((\omega_s+\omega_m)t - \phi_n)] + \\ &\qquad \exp[-j((\omega_s-\omega_m)t - \phi_n)]\} \end{aligned}$$

Next, the filter 4 extracts a low-frequency component from the product (the expression 11) of the multiplication. The product of the multiplication from which the low-frequency component is extracted is expressed by the expression 12. The filter 4 is formed by an accumulator and an element for computing the sum of products as in the prior art.

$$g_n(t) = A(t-\tau_n) \times \exp\{-j[(\omega_s-\omega_m)t - \phi_n]\} \qquad \text{Expression 12}$$

The digital delay unit 5 multiplies a signal acquired by delaying the signal (the expression 12) output from the filter 4 by $\tau_n$ by $\exp(-\omega_m\tau_n)$. A signal $V_n(t)$ output from the digital delay unit 5 is expressed by the expression 13. In the invention, a complex number multiplied in the digital delay unit 5 is not "$\phi_n = \omega_s \tau_n$" but the product $\omega_m \tau_n$. The output signal $V_n(t)$ is fixed independent of the channel number n.

$$\begin{aligned} V_n(t) &= g_n(t+\tau_n)\exp(-j\omega_m\tau_n) \qquad \text{Expression 13} \\ &= A(t) \times \exp\{-j[(\omega_s-\omega_m)(t+\tau_n) - \phi_n + \omega_m\tau_n]\} \\ &= A(t) \times \exp(-j[(\omega_s-\omega_m)t + \omega_s\tau_n - \omega_m\tau_n - \omega_s\tau_n + \omega_m\tau_n]) \\ &= A(t) \times \exp\{-j(\omega_s-\omega_m)t\} \end{aligned}$$

The adder 6 adds the output signal $V_n(t)$ output from the digital delay unit 5 in respect to element (channel) number n used for one sending/receiving of an ultrasonic wave for all N channels and the result of addition is expressed by the expression 14.

$$S(t) = N \times A(t) \times \exp\{-j(\omega_s-\omega_m)t\} \qquad \text{Expression 14}$$

The result of addition (the expression 14) grows N times of a signal of a single channel when the phase of each channel is coincident. N signal lines from the transducer 1 to the adder 6 are converted to one signal line after the adder 6.

In the result of the addition (the expression), the term of $\exp(-j(\omega_s-\omega_m)t)$ generally called a carrier component is left. As the carrier component is not required for the reconfiguration of tomographic images, the result of the addition (the expression 14) and the digital reference signal $k_n(t)$ expressed by the expression 15 are multiplied in the second mixer 11 in the invention.

As each processing in the analog to digital converter 2, the first mixer 10, the filter 4 and the digital delay unit 5 in the above description is executed every channel, parallel N pieces of respective units described above are required.

As N pieces of signals from the transducer 1 to the adder 6 are converted to one signal in the adder 6, only one second mixer 11 has only to be provided. A product of the multiplication of the expression 14 and the expression 15 is expressed by an expression 16.

$$k_n(t) = \exp\{j(\omega_s - \omega_m)t\} \qquad \text{Expression 15}$$

$$\begin{aligned} U(t) &= N \times A(t) \times \{\exp[-j(\omega_s-\omega_m)t]\} \times \{\exp(j[\omega_s-\omega_m]t)\} \quad \text{Expression 16} \\ &= N \times A(t) \end{aligned}$$

The absolute value of the product of the multiplication (the expression 16) is acquired by the envelope detector 7. As in the ultrasonic diagnostic apparatus according to the prior art shown in FIG. 2, the scan converter 8 applies signal processing such as the compression of a logarithm and gamma conversion to a signal output from the envelope detector 7. A signal output from the scan converter 8 is displayed on the display 9 as a tomographic image of an object to be inspected. In the expression 16, a complex number is generally acquired and the envelope detector 7 calculates the absolute value of the complex number (the root sum square of a real part and an imaginary part).

Next, it will be described that in the configuration described above and shown in FIG. 1, even if the center frequency of the received signal to be imaged is varied, the pass band of the filter 4 is not required to be varied.

Figure 2:
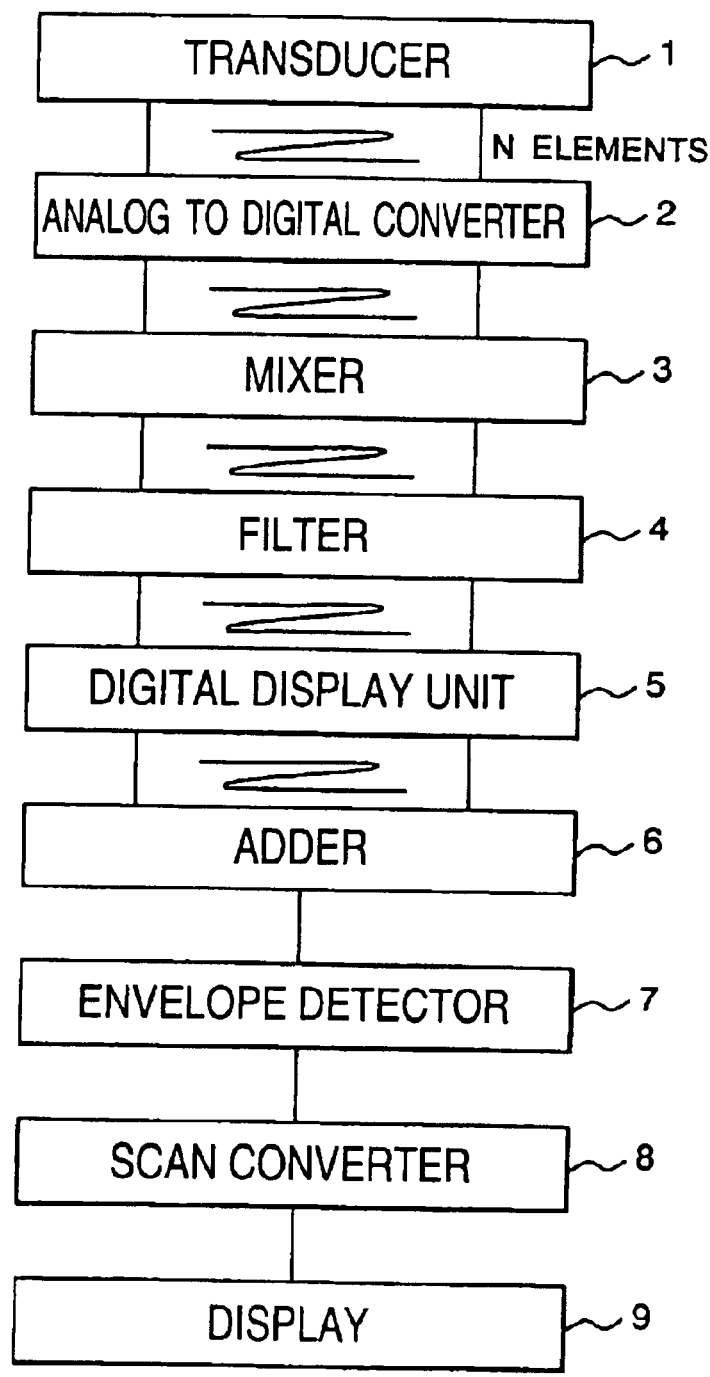
FIG. 2 is a block diagram showing an example of the configuration of an ultrasonic diagnostic apparatus according to prior art using a digital circuit.
Figure 3A:
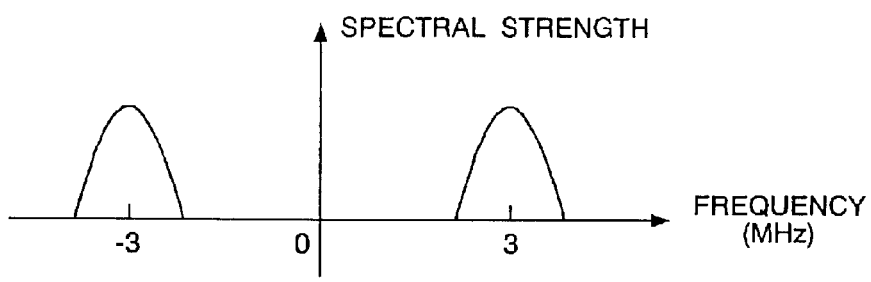
FIGS. 3a to 3c are explanatory drawings for explaining the spectral strength of an ultrasonic signal in the ultrasonic diagnostic apparatus according to the prior art shown in FIG. 2.

FIGS. 3a to 3c and 4 are explanatory drawings for explaining the spectral strength of an ultrasonic signal in the ultrasonic diagnostic apparatus according to the prior art shown in FIG. 2. FIG. 3a shows the skeletal form of a spectrum of a received signal expressed in the expression 8 in case the center frequency $\omega_s$ is 3 MHz and the shape of an envelope A (t) is Hanning window. In FIGS. 3 to 8, the axis of ordinates denotes spectral strength and the axis of abscissas denotes a frequency.

As a received signal expressed in the expression 8 is a real signal, the spectral shapes are symmetrical based upon the axis of ordinates. A spectrum of a received signal to be imaged is a spectrum acquired by moving the central position of either spectrum having the center at a frequency −3 MHz or 3 MHz to a frequency zero.

Figure 3B:
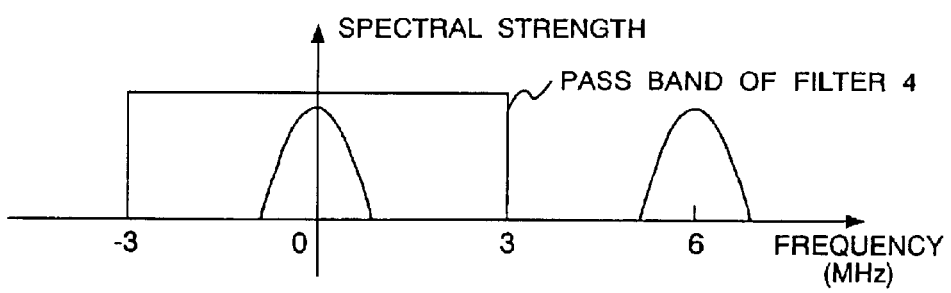

In the ultrasonic diagnostic apparatus according to the prior art shown in FIG. 2, the multiplication expressed in the expression 5 in case 3 MHz is substituted for $\omega_s$ in the expression 4 is executed. As a result of the multiplication, the spectrum shown in FIG. 3a is as shown in FIG. 3b. As shown in FIG. 3b, the central position of the spectrum of the received signal to be imaged is moved to the frequency zero and the central position of an unnecessary spectrum is moved to a frequency 6 MHz.

Figure 3C:
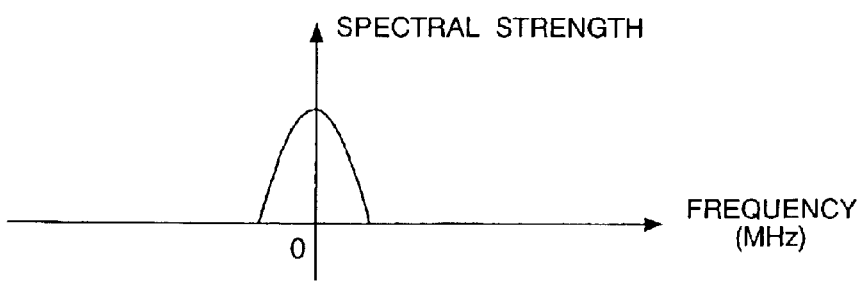

Next, a pass band for extracting a signal between the frequency −3 MHz and 3 MHz is applied to the filter 4 as in an example shown in FIG. 3b, the required spectrum is extracted and a spectrum shown in FIG. 3c is acquired. FIG. 3c shows the spectrum itself of the received signal to be imaged.

Figure 4A:
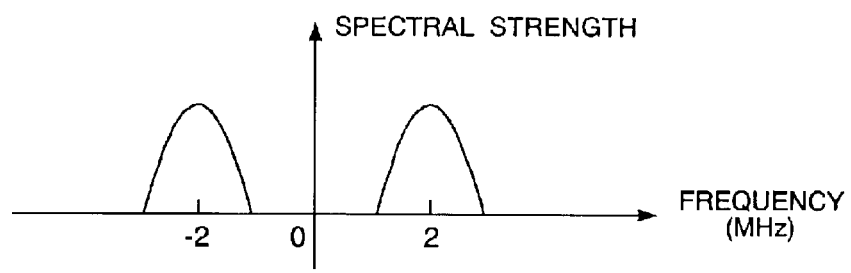
FIGS. 4a to 4c are explanatory drawings for explaining the spectral strength of an ultrasonic signal in the ultrasonic diagnostic apparatus according to the prior art shown in FIG. 2.

FIG. 4a shows the skeletal form of a spectrum of the received signal expressed in the expression 8 in case the center frequency $\omega_s$ is 2 MHz and the shape of an envelope A (t) is Hanning window. A spectrum of the received signal to be imaged is a spectrum acquired by moving the central position of either spectrum having the center at a frequency −2 MHz or 2 MHz to the frequency zero.

Figure 4B:
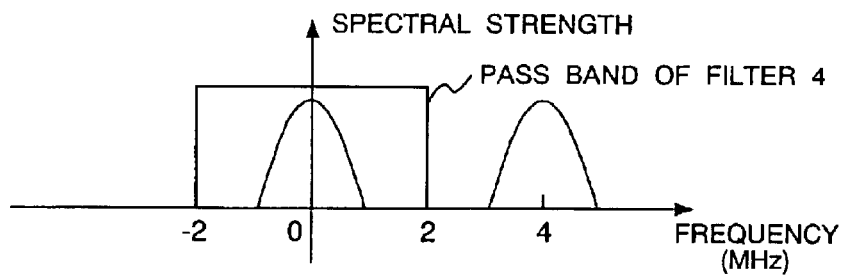

In the ultrasonic diagnostic apparatus according to the prior art shown in FIG. 2, multiplication expressed in the expression 5 in case 2 MHz is substituted for $\omega_s$ in the expression 4 is executed. As a result of the multiplication, the spectrum shown in FIG. 4a is as shown in FIG. 4b. As shown in FIG. 4b, the central position of a spectrum of the received signal to be imaged is moved to the frequency zero and the central position of an unnecessary spectrum is moved to a frequency 4 MHz.

Figure 4C:
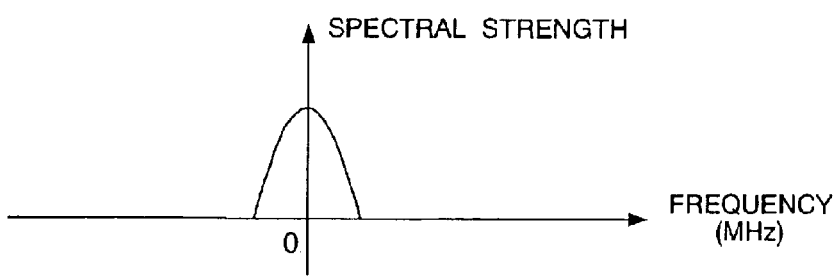

Next, a pass band for extracting a signal between the frequency −2 MHz and 2 MHz is applied to the filter 4 as in an example shown in FIG. 4b, the required spectrum is extracted and a spectrum shown in FIG. 4c is acquired. FIG. 4c shows the spectrum itself of the received signal to be imaged.

When the pass band shown in FIG. 4b of the filter 4 is the same as the pass band shown in FIG. 3B of the filter 4, the unnecessary spectrum having the center at the frequency 4 MHz cannot be completely removed and the quality of the image is deteriorated.

Therefore, it is clarified by the comparison of FIG. 3b and FIG. 4b that in the ultrasonic diagnostic apparatus according to the prior art shown in FIG. 2, it is a requirement to vary the pass band of the filter 4 corresponding to the center frequency of a received signal to be imaged.

As the filter the frequency domain of a spectrum extracted by which is narrow has multiple taps as in the example shown in FIG. 4b, the scale of the circuit is larger than that of the filter having the pass band shown in FIG. 3b.

In the configuration of the ultrasonic diagnostic apparatus equivalent to the first embodiment of the invention, even if a received signal has the spectrum shown in FIG. 4a, the pass band of the filter 4 can be equalized to that shown in FIG. 3b.

Figure 5A:
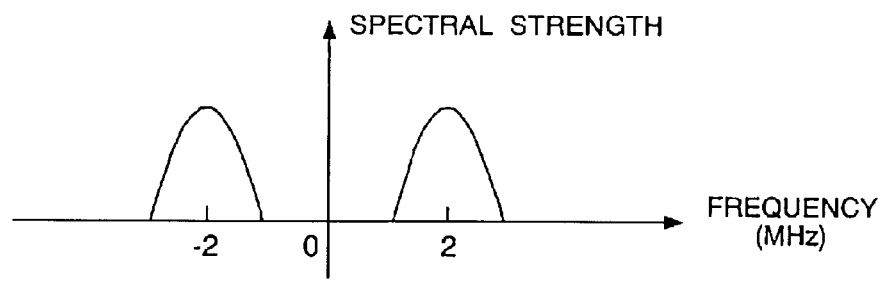
FIGS. 5a to 5d are explanatory drawings for explaining the spectral strength of an ultrasonic signal in the ultrasonic diagnostic apparatus equivalent to the first embodiment of the invention.
Figure 5B:
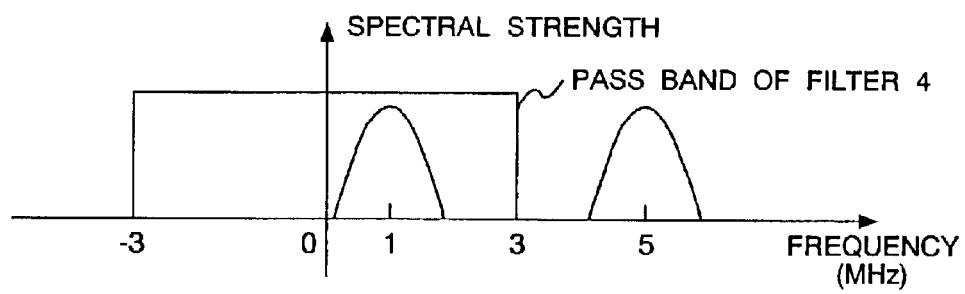

FIGS. 5a to 5d are explanatory drawings for explaining the spectral strength of an ultrasonic signal in the ultrasonic diagnostic apparatus equivalent to the first embodiment of the invention. FIG. 5a shows the skeletal form of a spectrum of an ultrasonic signal in case the center frequency $\omega_s$ is 2 MHz and the shape of an envelope A(t) is Hanning window. In the invention, the multiplication expressed by the expression 11 in case 3 MHz is substituted for $\omega_m$ in the expression 10 is executed. As a result of the multiplication, a spectrum shown in FIG. 5b is acquired.

As shown in FIG. 5b, the central position of a spectrum of a received signal to be imaged is moved to a frequency 1 MHz and the central position of an unnecessary spectrum is moved to a frequency 5 MHz. A pass band for extracting a signal between the frequency −3 MHz and 3 MHz is applied to the filter 4 as in FIG. 3b, the required spectrum is extracted and a spectrum shown in FIG. 5c is acquired.

Figure 5C:
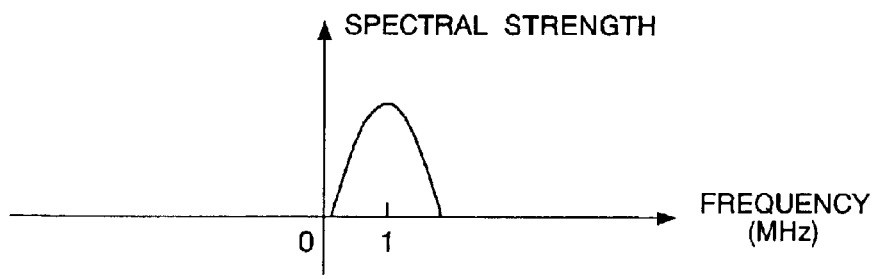

As shown in FIG. 5c, the spectrum the center of which is located at the frequency 1 MHz is left and a spectrum the center of which is located at the frequency 5 MHz is removed. The spectrum shown in FIG. 5c is a spectrum of a signal output from the adder 6.

The center of a spectrum of an ultrasonic signal to be imaged is required to be located at the frequency zero as shown in FIG. 4c and the spectrum shown in FIG. 5c cannot be imaged as it is.

Figure 5D:
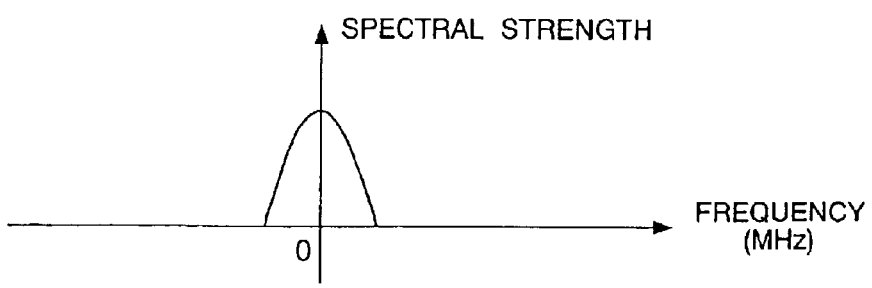

Then, in the invention, the multiplication expressed by the expression 16 in case 2 MHz is substituted for $\omega_s$ in the expression 15, that is, $(\omega_s - \omega_m) = -1$ MHz is executed. As a result of the multiplication, the spectrum shown in FIG. 5C becomes a spectrum shown in FIG. 5D and the spectrum shown in FIG. 5d is the same as the spectrum to be imaged shown in FIG. 4c.

In the configuration of the ultrasonic diagnostic apparatus equivalent to the first embodiment of the invention, in case a received signal the center frequency of which is 3 MHz is imaged, the multiplication expressed by the expression 11 in case 3 MHz is substituted for $\omega_s$ and 3 MHz is substituted for $\omega_m$ in the expression 10 is executed. As a result of the multiplication, the spectrum is the same as the spectrum shown in FIG. 3b.

As shown in FIG. 3b, the center of the spectrum of the received signal to be imaged is moved to the frequency zero and the center of an unnecessary spectrum is moved to the frequency 6 MHz. A pass band for extracting a signal between the frequency −3 MHz and 3 MHz is applied to the filter 4, the required spectrum is extracted and the spectrum which is a spectrum of a received signal to be imaged itself and is the same as the spectrum shown in FIG. 3c is acquired.

As described above, in the configuration of the ultrasonic diagnostic apparatus equivalent to the first embodiment of the invention, received signals the respective center frequencies of which are 3 MHz and 2 MHz can be imaged without changing the pass band of the filter 4. Also as described above, for the second mixer 11, one has only to be provided. As the configuration of the filter 4 can be simplified by adding one mixer circuit, the addition of one mixer circuit greatly contributes to the miniaturization and the reduction of the price of the apparatus.

Second Embodiment

Figure 6:
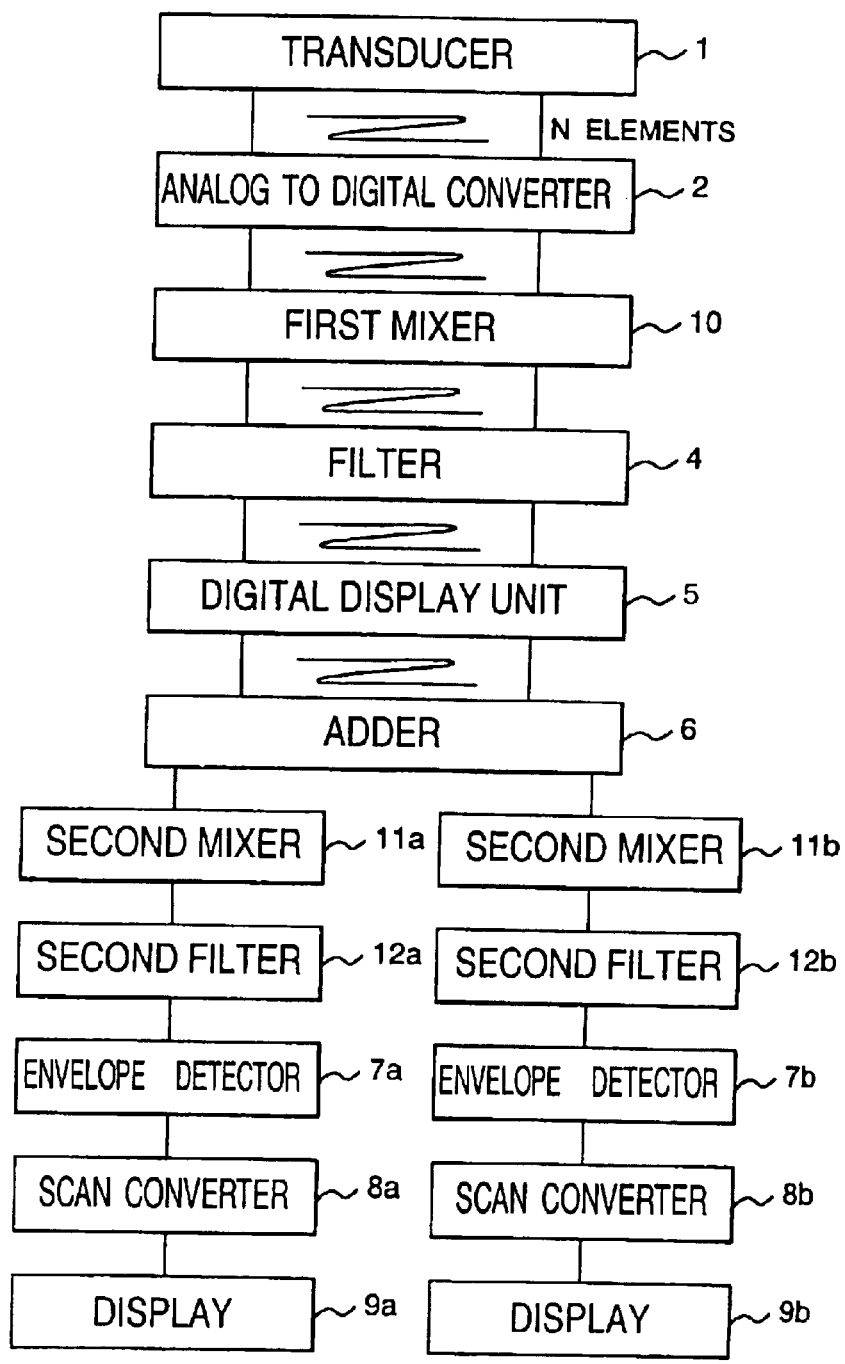
FIG. 6 is a block diagram showing an example of the configuration of an ultrasonic diagnostic apparatus equivalent to the second embodiment of the invention.

FIG. 6 shows an example of the configuration of an ultrasonic diagnostic apparatus equivalent to a second embodiment of the invention. In detail, FIG. 6 shows the example of the configuration of the ultrasonic diagnostic apparatus that simultaneously images and displays plural received signals different in a center frequency without changing each configuration of the analog to digital converter 2, the mixer 3, the filter 4 and the digital delay unit 5 respectively required every channel in the configuration of the ultrasonic diagnostic apparatus shown in FIG. 1.

The configuration of the analog to digital converter 2, the first mixer 10, the filter 4 and the digital delay unit 5 respectively required every channel in the configuration of the ultrasonic diagnostic apparatus shown in FIG. 6 is the same as that of the ultrasonic diagnostic apparatus shown in FIG. 1. The configuration of the ultrasonic diagnostic apparatus shown in FIG. 6 is based upon that of the ultrasonic diagnostic apparatus shown in FIG. 1 and is characterized in that first and second signal processing circuits for executing signal processing succeeding second mixers 11 are provided in parallel and second filters 12 are provided between each second mixer 11 and each envelope detector 7 in the first and second signal processing circuits.

The first signal processing circuit is composed of the second mixer 11a, the second filter 12a, the envelope detector 7a, the scan converter 8a and the display 9a, and the second signal processing circuit is composed of the second mixer 11b, the second filter 12b, the envelope detector 7b, the scan converter 8b and the display 9b.

The configuration of the ultrasonic diagnostic apparatus shown in FIG. 6 shows the effect in harmonic imaging for example. Harmonic imaging means a method of sending an ultrasonic signal of a frequency $f_0$ and imaging a harmonic component (for example, a component of $2f_0$) of its received signal. According to this method, acoustic S/N can be greatly improved, compared with normal imaging in which a fundamental wave component (a component of $f_0$) of a received signal is imaged.

Figure 7A:
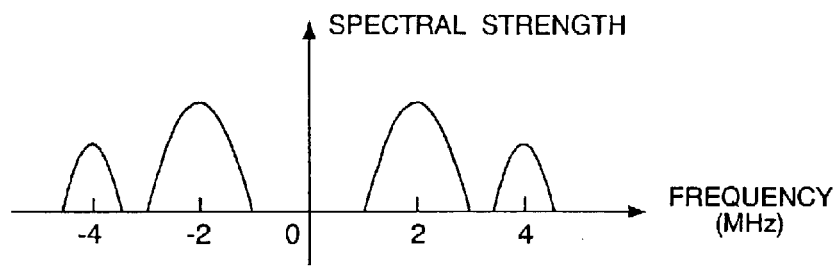
FIGS. 7a to 7c are explanatory drawings for explaining the spectral strength of an ultrasonic signal in the ultrasonic diagnostic apparatus equivalent to the second embodiment of the invention.

FIGS. 7a to 7c and 8 are explanatory drawings for explaining the spectral strength of an ultrasonic signal in the ultrasonic diagnostic apparatus equivalent to the second embodiment of the invention. FIG. 7a shows the spectrum of a received signal of a frequency 2 MHz also including a component of 4 MHz which is a harmonic component. The spectral strength of the harmonic component is smaller than that of a fundamental wave component.

In the ultrasonic diagnostic apparatus according to the prior art shown in FIG. 2, in case a received signal is imaged based upon its fundamental wave component, $\omega_s$ becomes 2 MHz according to the expression 4. In case a received signal is imaged based upon its harmonic component, $\omega_s$ becomes 4 MHz according to the expression 4. However, according to the ultrasonic diagnostic apparatus according to the prior art shown in FIG. 2, an image based upon its fundamental wave component of a received signal and an image based upon its harmonic component of the received signal cannot be simultaneously processed and displayed.

To simultaneously process and display an image based upon its fundamental wave component of a received signal and an image based upon its harmonic component of the received signal, it is considered that first and second signal processing circuits for executing signal processing succeeding the mixer 3 are provided in parallel in the ultrasonic diagnostic apparatus according to the prior art shown in FIG. 2 and each signal processing circuit is composed of the mixer 3, the filter 4, the digital delay unit 5, the adder 6, the envelope detector 7, the scan converter 8 and the display 9.

When multiplication in which 2 MHz is substituted for $\omega_s$ is executed by the mixer in the first signal processing circuit and multiplication in which 4 MHz is substituted for $\omega_s$ is executed by the mixer in the second signal processing circuit, an image based upon its fundamental wave component of a received signal and an image based upon its harmonic component of the received signal can be simultaneously imaged. However, as the mixer 3, the filter 4 and the digital delay unit 5 are required to be provided by the number of channels, the scale of the circuit becomes enormous.

Figure 7B:
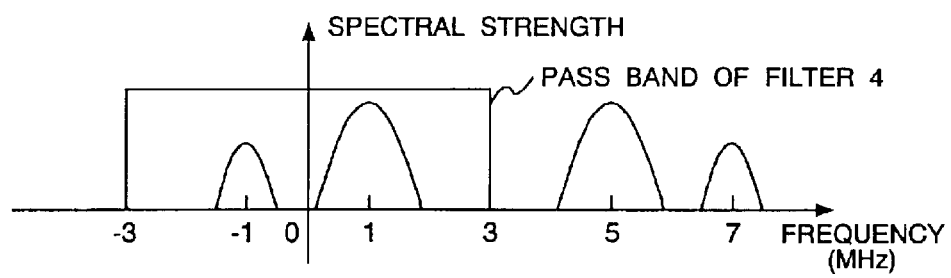

In the configuration of the ultrasonic diagnostic apparatus shown in FIG. 6, multiplication expressed by the expression 11 in case 3 MHz is substituted for $\omega_m$ which is the mean frequency of the fundamental wave 2 MHz of a received signal and the higher harmonics 4 MHz of the received signal in the expression 10 is executed. As a result of the multiplication, the spectrum shown in FIG. 7a becomes a spectrum shown in FIG. 7b. As shown in FIG. 7b, each center of spectrums of the received signal to be imaged is moved to frequencies −1 MHz and 1 MHz and each center of unnecessary spectrums is moved to frequencies 5 MHz and 7 MHz.

In case the fundamental wave component of the received signal is imaged, the spectrum having the center at the frequency 1 MHz is required to be left and in case the harmonic component of the received signal is imaged, the spectrum having the center at the frequency −1 MHz is required to be left. As the mean value of frequencies of the fundamental wave of the received signal and higher harmonics of the received signal is used for a mixing frequency ($\omega_m$=3 MHz), respective center frequencies of the spectra of two received signal to be imaged are symmetrical based upon the axis of ordinates.

Figure 7C:
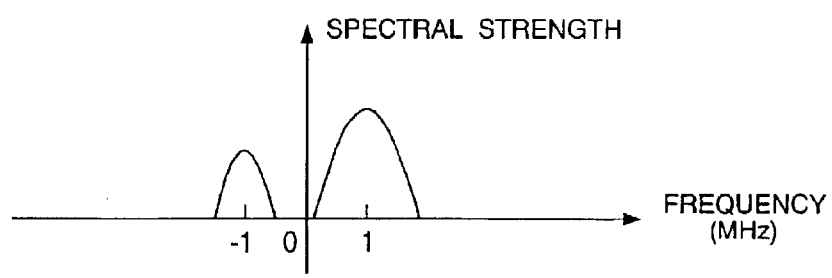

As shown in FIG. 7b, the same pass band as that in FIG. 3b is applied to the filter 4. The spectrum of a signal output from the filter 4 is as shown in FIG. 7c. As a delay process and an adding process do not change the shape of a spectrum, the spectrum of a signal output from an adder 6 is also the same as that shown in FIG. 7c.

Next, the second mixers 11a and 11b provided in parallel separately execute shift in a frequency. The second mixer 11a multiplies the expression 14 and the expression 15 in which 4 MHz is substituted for $\omega_s$ and 1 MHz is substituted for ($\omega_s - \omega_m$). As a result of the multiplication, the spectrum is as shown in FIG. 8A.

Figure 8A:
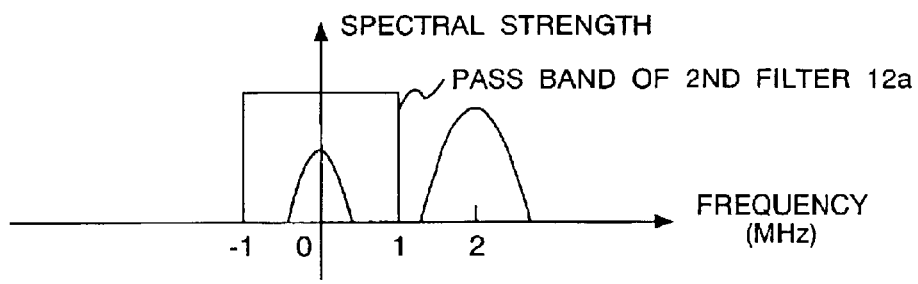
FIGS. 8a to 8d are explanatory drawings for explaining the spectral strength of an ultrasonic signal in the ultrasonic diagnostic apparatus equivalent to the second embodiment of the invention.
Figure 8B:
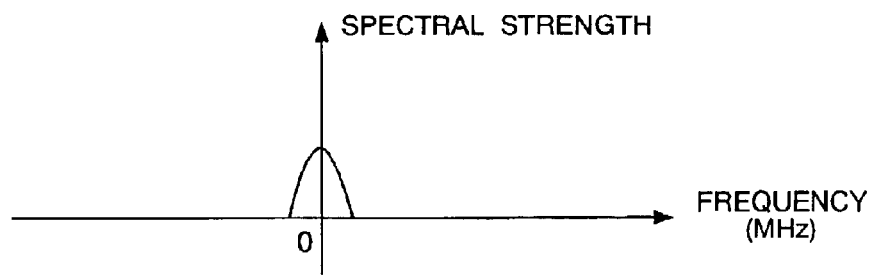

A pass band shown in FIG. 8a is applied to the second filter 12a and only the spectrum of a harmonic component is passed. That is, the spectrum having the center at the frequency zero is left. FIG. 8b shows the spectrum of a signal output from the second filter 12a.

The second mixer 11b multiplies the expression 14 and the expression 15 in which 2 MHz is substituted for $\omega_s$ and −1 MHz is substituted for ($\omega_s - \omega_m$). As a result of the multiplication, the spectrum is as shown in FIG. 8c.

Figure 8C:
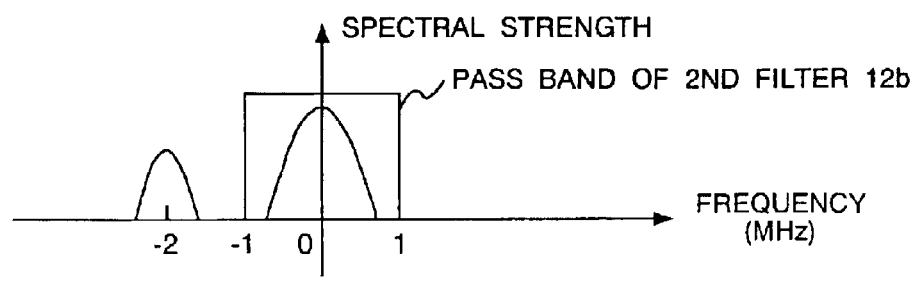
Figure 8D:
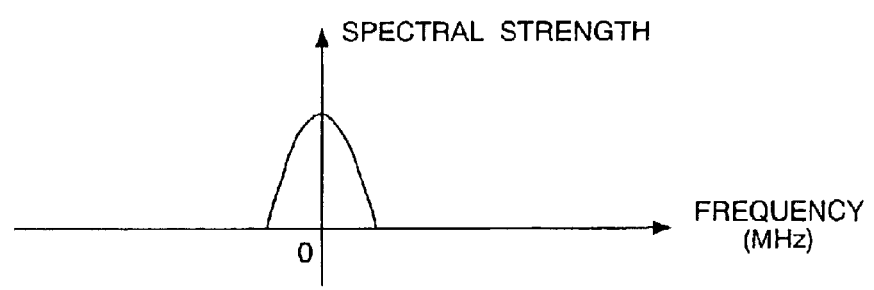

A pass band shown in FIG. 8c is applied to the second filter 12b and only the spectrum of the fundamental wave component of the received signal is passed. That is, the spectrum having the center at the frequency zero is left. FIG. 8d shows the spectrum of a signal output from the second filter 12b.

As filtering is executed for the signal output from the adder 6, two second filters 12a and 12b as a whole have only to be provided and even if the scale of the filter circuit is expanded, it does not have a large effect upon the price and the scale of the whole apparatus.

Each operation of the envelope detectors 7a and 7b, the scan converters 8a and 8b and the displays 9a and 9b is the same as that in the first embodiment shown in FIG. 1. Signals output from the scan converters 8a and 8b can be also displayed on one display.

In the above description, in case the image of the fundamental wave component of the received signal and the image of the harmonic component of the received signal are simultaneously imaged and displayed, the mean frequency of frequencies of the fundamental wave of the received signal and the higher harmonics of the received signal is substituted for $\omega_m$. As long as the pass band of the filter 4 shown in FIG. 7b is varied even if $\omega_m$ in the expression 10 is an arbitrary frequency and the frequency of the fundamental wave of the received signal or the frequency of the higher harmonics of the received signal is substituted for $\omega_s$ in the expression 15, the expression 16 is unchanged, and the image of the fundamental wave component of the received signal and the image of the harmonic component of the received signal can be simultaneously imaged.

However, in an actual ultrasonic diagnostic apparatus, an amount of time delay by the digital delay unit 5 is discrete and the minimum unit is equal to sampling time in the analog to digital converter 2 for example. That is, it is difficult to precisely delay a signal by $\tau_n$.

When an error is included in a delay, the expression 7 is unchanged, however, the expression 16 varies. This will be described below.

In the ultrasonic diagnostic apparatus shown in FIG. 2, only an envelope component is influenced by time delay in the expression 7. As the period of an envelope is long enough, compared with sampling time, an error below sampling time included in a delay does not matter and the expression 7 is unchanged.

However, in the ultrasonic diagnostic apparatuses shown in FIGS. 1 and 6, a carrier component is also influenced by time delay in the expression 13. A period of a carrier is not long enough, compared with sampling time. Therefore, in case an error is included in a delay, first, the expression 13 varies.

An actual delay for the expression 12 is set to $T_n$ and an error of time delay is defined by an expression 17.

$$\Delta\tau_n = T_n - \tau_n \qquad \text{Expression 17}$$

The digital delay unit 5 delays a signal expressed by the expression 12 by $T_n$ and multiplies it by $\exp(-j\omega_m\tau_n)$. As the precision of complex multiplication depends upon the precision of calculation by an arithmetic circuit, the precision can be sufficiently fined independent of sampling time. "$V_n$ (t)" expressed by the expression 18 is output from the digital delay unit 5.

$$V_n(t) = g_n(t + T_n)\exp(-j\omega_m \tau_n) \quad \text{Expression 18}$$
$$= A(t - \tau_n + T_n) \times \exp\{-j[(\omega_s - \omega_m)(t + T_n) - \phi_n + \omega_m \tau_n]\}$$
$$= A(t + \Delta\tau_n) \times \exp\{-j[(\omega_s - \omega_m)t +$$
$$\omega_s T_n - \omega_m T_n - \omega_s \tau_n + \omega_m \tau_n)\}$$
$$= A(t + \Delta\tau_n) \times \{\exp[-j(\omega_s - \omega_m)t]\}\{\exp\{-j(\omega_s - \omega_m)\Delta\tau_n]\}$$

As the period of an envelope is long enough, compared with sampling time, the product of the expression 18 approximates that of an expression 19 when the expression 19 is met.

$$A(t+\Delta\tau_n)=A(t) \quad \text{Expression 19}$$

However, $\Delta\tau_n$ in the term exp cannot be ignored. As $\Delta\tau_n$ is different every channel, the result of the addition of $V_n(t)$ every channel of n pieces of elements used for one sending/receiving of an ultrasonic wave by the adder 6 is S (t) shown in the expression 20.

$$S(t)=A(t)\times\{\exp[-j(\omega_s-\omega_m)t]\}\times\{\Sigma\exp[-j(\omega_s-\omega_m)\Delta\tau_n]\} \quad \text{Expression 20}$$

In the expressions 20 and 21, an adding symbol $\Sigma$ denotes addition every channel. The second mixer 11 executes complex mixing with the digital reference signal $k_n(t)$ expressed in the expression 11. The result of the multiplication of the expression 14 and the expression 20 is U (t) expressed by an expression 21.

$$U(t)=A(t)\times\{\Sigma\exp[-j(\omega_s-\omega_m)\Delta\tau_n]\} \quad \text{Expression 21}$$

That is, in case an error $\Delta\tau_n$ is included in a delay, the expression 16 is equal to the expression 21. For example, if the sampling time of the analog to digital converter 2 is 40 ns and an actual delay $T_n$ is equivalent to an integral multiple of the sampling time, the absolute value of $\Delta\tau_n$ is 20 ns maximum.

If $\omega_m=3$ MHz, $(\omega_s-\omega_m)$ $\Delta\tau_n$ can be 1/50 wavelength maximum in case both $\omega_s=2$ MHz and $\omega_s=4$ MHz. Generally, as $(\omega_s-\omega_m)$ $\Delta\tau_n$ may be ignored in forming a beam of an ultrasonic wave if it is 1/32 wavelength or less, an error in the expression 21 is in a range in which the error may be ignored.

However, if $\omega_s=2$ MHz in case $\omega_m=2.2$ MHz, $(\omega_s-\omega_m)$ $\Delta\tau_n$ is 1/250 wavelength maximum, however, if $\omega_s=4$ MHz, $(\omega_s-\omega_m)$ $\Delta\tau_n$ is 1/28 wavelength maximum. In this case, for the fundamental wave component of a received signal, the error in the expression 21 may be ignored, however, for the harmonic component of the received signal, the error in the expression 21 cannot be ignored.

That is, there is an advantage that when the mean value of the frequency of a fundamental wave of a received signal and the frequency of higher harmonics of the received signal is substituted for $\omega_m$, the error in the expression 21 can be reduced in any frequency.

In case two different frequency components of a received signal are imaged and are simultaneously displayed, the two frequency components are not limited to a fundamental wave of the received signal and higher harmonics of the received signal and can be set to arbitrary predetermined two frequencies.

INDUSTRIAL APPLICABILITY

As described above, according to the invention, received signals different in a center frequency can be imaged without changing the pass band of the filter.

Further, signal processing for acquiring plural images different in the center frequency of the received signal can be simultaneously executed in parallel, even if the center frequency of the received signal to be imaged is varied, the pass band of the filter every channel is not required to be varied and the digital ultrasonic diagnostic apparatus by which a high quality of tomographic image can be acquired can be realized.

What is claimed is:

1. An ultrasonic diagnostic apparatus, comprising:

a transducer including plural elements that send an ultrasonic wave to an object to be inspected and receive the ultrasonic wave reflected from the object to be inspected;

an analog to digital converter that digitizes each of plural received signals received by the plural elements;

a first mixer that multiplies a signal output from the analog to digital converter and a first digital reference signal;

a first filter that extracts a signal having a predetermined center frequency from a signal output from the first mixer;

a digital delay unit that delays signals output from the first filter;

an adder that adds plural signals output from the digital delay unit;

a second mixer that multiplies a signal output from the adder and a second digital reference signal;

an envelope detector that detects a signal output from the second mixer;

a scan converter that converts a signal output from the envelope detector to a picture signal; and a display that displays a signal output from the scan converter.

2. An ultrasonic diagnostic apparatus, comprising:

a transducer including plural elements that send an ultrasonic wave to an object to be inspected and receive the ultrasonic wave reflected from the object to be inspected;

an analog to digital converter that digitizes each of plural received signals received by the plural elements;

a first mixer that multiplies a signal output from the analog to digital converter and a first digital reference signal;

a first filter that extracts a signal having a predetermined center frequency from a signal output from the first mixer;

a digital delay unit that delays a signal output from the first filter;

an adder that that adds plural signals output from the digital delay unit; and plural signal processing circuits connected to the output terminal of the adder in parallel, wherein each signal processing circuit comprises:

a second mixer that multiplies a signal output from the adder and a second digital reference signal;

a second filter that extracts a signal having a predetermined center frequency from a signal output from the second mixer;

an envelope detector that detects a signal output from the second filter;

a scan converter that converts a signal output from the envelope detector to a picture signal; and a display that displays a signal output from the scan converter, wherein, in each signal processing circuit, the second filter extracts a signal having a predetermined center frequency different from a center frequency of other ones of the signal processing circuits, from the signal output from the second mixer.

3. An ultrasonic diagnostic apparatus according to claim 2, wherein the plural signal processing circuits include a first signal processing circuit and a second signal processing circuit, where the first signal processing circuit and the second signal processing circuit respectively comprise a second mixer that multiplies a signal output from the adder and a second digital reference signal, a second filter that extracts a signal having a predetermined center frequency from a signal output from the second mixer, an envelope detector that detects a signal output from the second filter, a scan converter that converts a signal output from the envelope detector to a picture signal, and a display that displays a signal output from the scan converter, and wherein, in the first and second signal processing circuits, each second filter extracts a signal having a predetermined center frequency different between the first and second signal processing circuits from a signal output from the second mixer, and images of a first center frequency and a second center frequency are acquired in parallel.

4. An ultrasonic diagnostic apparatus according to claim 3, wherein the frequency of the first digital reference signal is set between the first center frequency and the second center frequency.

5. An ultrasonic diagnostic apparatus according to claim 3, wherein one of the first and second center frequency is a harmonic of the other of the first and second center frequency.

6. An ultrasonic diagnostic apparatus according to claim 2, wherein images having different center frequencies are displayed on the same display or on different displays.

7. An ultrasonic diagnostic apparatus according to claim 1 or 2, wherein the sum of the frequency of the first digital reference signal and the frequency of the second digital reference signal is equalized to a center frequency of a received signal to be imaged.

8. An ultrasonic diagnostic apparatus, comprising:

a transducer including plural elements;

a selecting/driving circuit that selects plural n pieces of elements (n=1, 2, - - - , N) for sending an ultrasonic wave having a center frequency $\omega_s$ to an object to be inspected and receiving the ultrasonic wave having the center frequency $\omega_s$ reflected from the object to be inspected;

analog to digital converters provided corresponding to the plural n pieces of elements (n=1, 2, - - - , N) for digitizing a received signal received by the element;

first mixers provided corresponding to the analog to digital converters corresponding to the elements for multiplying a signal output from each analog to digital converter and a first digital reference signal having a frequency $\omega_m$ different from the center frequency $\omega_s$;

first filters provided corresponding to the first mixers corresponding to the elements for extracting a signal having a frequency ($\omega_m-\omega_s$) from a signal output from each first mixer;

digital delay units provided corresponding to the first filters corresponding to the elements for multiplying a signal output from each first filter and delayed by propagation delay time $\tau_n$ different in every element from the sending of the ultrasonic wave to the receiving of it by $\exp(-j\omega_m\tau_n)$;

an adder corresponding to the plural n pieces of elements (n=1, 2, - - - , N) for adding signals output from the digital delay units;

a second mixer that multiplies a signal output from the adder and a second digital reference signal having a frequency ($\omega_s-\omega_m$);

an envelope detector that detects a signal output from the second mixer;

a scan converter that converts a signal output from the envelope detector to a picture signal; and a display that displays a signal output from the scan converter, wherein a received signal having the center frequency $\omega_s$ is imaged and displayed.

9. A method of processing an ultrasonic signal, comprising the steps of:

selecting plural n pieces of elements (n=1, 2, - - - , N) of a transducer including plural elements for sending an ultrasonic wave having a center frequency $\omega_s$ to an object to be inspected and receiving the ultrasonic wave reflected from the object to be inspected and having the center frequency $\omega_s$ and driving them;

digitizing plural received signals received by the elements in analog to digital converters provided corresponding to the plural n pieces of elements (n=1, 2, - - - , N);

multiplying a signal output from each analog to digital converter and a first digital reference signal having a frequency $\omega_m$ different from the center frequency $\omega_s$ in the first mixers provided corresponding to the analog to digital converters corresponding to the plural n pieces of elements (n=1, 2, - - - , N);

extracting a signal having a frequency ($\omega_m-\omega_s$) from a signal output from each first mixer in first filters provided corresponding to the first mixers corresponding to the elements;

multiplying a signal acquired by delaying a signal output from each first filter by propagation delay time $\tau_n$ different every element from the sending of the ultrasonic wave to the receiving of it by $\exp(-j\omega_m\tau_n)$ in digital delay time units provided corresponding to the first filters corresponding to the elements;

adding signals output from the digital delay units corresponding to the plural n pieces of elements (n=1, 2, - - - , N) in an adder;

multiplying a signal output from the adder and a second digital reference signal having a frequency ($\omega_s-\omega_m$) in a second mixer;

detecting a signal output from the second mixer in an envelope detector;

converting a signal output from the envelope detector to a picture signal in a scan converter; and displaying a signal output from the scan converter on a display, wherein the received signal having the center frequency $\omega_s$ is imaged and displayed.

* * * * *